US010939289B1

(12) United States Patent
Krishnakumar et al.

(10) Patent No.: US 10,939,289 B1
(45) Date of Patent: Mar. 2, 2021

(54) GROUP PAIRING OF PERIPHERAL DEVICES

(71) Applicant: Dell Products, L.P., Round Rock, TX (US)

(72) Inventors: Karthikeyan Krishnakumar, Austin, TX (US); Vivek Viswanathan Iyer, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 16/705,300

(22) Filed: Dec. 6, 2019

(51) Int. Cl.
*H04W 12/00* (2009.01)
*H04W 8/00* (2009.01)
*G06F 3/0489* (2013.01)
*H04W 4/80* (2018.01)
*H04W 92/18* (2009.01)
*H04W 84/12* (2009.01)
*H04W 84/18* (2009.01)
*H04W 88/04* (2009.01)
*H04W 76/15* (2018.01)

(52) U.S. Cl.
CPC .. *H04W 12/00305* (2019.01); *G06F 3/04897* (2013.01); *H04W 4/80* (2018.02); *H04W 8/005* (2013.01); *H04W 76/15* (2018.02); *H04W 84/12* (2013.01); *H04W 84/18* (2013.01); *H04W 88/04* (2013.01); *H04W 92/18* (2013.01)

(58) Field of Classification Search
CPC . H04W 12/00305; H04W 76/15; H04W 4/80; H04W 8/005; H04W 84/12; H04W 84/18; H04W 88/04; H04W 92/18; H04W 12/06; H04W 76/14; H04W 48/12; G06F 3/04897; G06F 1/1654; G06F 13/385; G06Q 30/0621
See application file for complete search history.

(56) References Cited

U.S. PATENT DOCUMENTS

| | | | | |
|---|---|---|---|---|
| 2007/0123166 | A1* | 5/2007 | Sheynman | H04W 8/26 455/41.2 |
| 2014/0064258 | A1* | 3/2014 | Montag | H04W 84/12 370/338 |
| 2014/0172620 | A1* | 6/2014 | Kumar Somayajula | G06Q 30/0621 705/26.5 |
| 2014/0366105 | A1* | 12/2014 | Bradley | H04W 12/06 726/5 |
| 2015/0071216 | A1* | 3/2015 | Ilsar | H04W 48/12 370/329 |
| 2017/0078300 | A1* | 3/2017 | He | G06F 13/385 |

(Continued)

*Primary Examiner* — Ayaz R Sheikh
*Assistant Examiner* — Louis Samara
(74) *Attorney, Agent, or Firm* — Fogarty LLP

(57) ABSTRACT

Systems and methods for group pairing of peripheral devices are described. In some embodiments, an Information Handling System (IHS) may include: a processor; and a memory coupled to the processor, the memory having program instructions stored thereon that, upon execution, cause the IHS to: ask a user whether to pair a first wireless device to the IHS; in response to an affirmative answer, pair the first wireless device to the IHS; retrieve mesh information from the first wireless device, where the mesh information comprises an identification of a second wireless device; and automatically pair the second wireless device to the IHS using the mesh information and without prompting the user.

20 Claims, 5 Drawing Sheets

(56) References Cited

U.S. PATENT DOCUMENTS

2017/0220490 A1\* 8/2017 Tan .................. G06F 1/1654
2019/0182885 A1\* 6/2019 Carlson ............. H04W 76/14

\* cited by examiner

GROUP PAIRING OF PERIPHERAL DEVICES

FIELD

This disclosure relates generally to Information Handling Systems (IHSs), and more specifically, to systems and methods for group pairing of peripheral devices.

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

BLUETOOTH is a wireless technology standard used for exchanging data between IHSs and peripheral devices over short distances using short-wavelength UHF radio waves in the industrial, scientific, and medical radio bands, from 2.400 to 2.485 GHz, and for building personal area networks (PANs). Examples of BLUETOOTH devices include, but are not limited to: mice, keyboards, graphics tablets, image scanners, barcode readers, styluses, cameras, webcams, game pads, memories, monitors, projectors, printers, microphones, headphones, headsets, loudspeakers, etc.

Conventionally, when a user purchases BLUETOOTH peripheral(s) along with an IHS, the factory, manufacturer, warehouse, and/or seller of the IHS may pre-pair the peripheral(s) to a dongle. The dongle is a small piece of hardware device that plugs into a port of the IHS (e.g., a Universal Serial Bus or "USB" port) and allows BLUETOOTH peripherals to connect to the IHS via the BLUETOOTH protocol. Because the peripherals are already paired to the dongle prior to being shipped from the factory, there is no need for the customer to perform additional pairing processes upon receipt of these components.

The inventors hereof have recognized, however, that as the technology transitions to newer BLUETOOTH 4.0, BLUETOOTH Low Energy (LE, BTLE or BLE) protocols, and beyond, the absence of a dongle in such solutions will result in customers having to manually pair peripheral devices to their IHSs. In those scenarios, a customer would have to repeat a separate pairing process for each of the peripherals it wants to use with the IHS. Moreover, if the customer wants to use the same peripherals with multiple IHS, it has to repeat all pairing procedures for each IHS.

SUMMARY

Systems and methods for group pairing of peripheral devices are described. In an illustrative, non-limiting embodiment, an Information Handling System (IHS) may include: a processor; and a memory coupled to the processor, the memory having program instructions stored thereon that, upon execution, cause the IHS to: ask a user whether to pair a first wireless device to the IHS; in response to an affirmative answer, pair the first wireless device to the IHS; retrieve mesh information from the first wireless device, where the mesh information comprises an identification of a second wireless device; and automatically pair the second wireless device to the IHS using the mesh information and without prompting the user.

In some cases, to ask the user whether to pair the first wireless device, the program instructions, upon execution, may cause the IHS to display a message via a Graphical User Interface (GUI), and where the affirmative answer is received via a keyboard, mouse, or trackpad coupled to the IHS. The first wireless device and the second wireless device may include BLUETOOTH-enabled devices, and where each device may be selected from the group consisting of: mouse, keyboard, graphics tablet, image scanner, barcode reader, stylus, camera, webcam, game pad, memory, monitor, projector, printer, microphone, headphones, headset, and loudspeaker.

The identification may include at least one of an address or a name of the second wireless device. The mesh information may be stored in an internal memory of the first wireless device. Additionally, or alternatively, the mesh information may be stored in the internal memory during prior to shipment of the first wireless device to the user.

The program instructions, upon execution, may cause the IHS to, prior to the automatic pairing of the second wireless device to the IHS, retrieve other mesh information from the second wireless device identifying the first wireless device. Additionally, or alternatively, the program instructions, upon execution, may cause the IHS to, prior to the automatic pairing of the second wireless device to the IHS, retrieve other mesh information from the second wireless device identifying the IHS.

In some cases, the program instructions, upon execution, may cause the IHS to: receive an instruction from a remote service; and in response to the instruction, transmit a command to the first wireless device to update the mesh information. The command may be configured to remove the identification of the second wireless device from the mesh information in response to the remote service receiving an indication that the second wireless device is not being used. Additionally, or alternatively, the command may be configured to add an identification of a third wireless device to the mesh information in response to the remote service receiving an indication that the third wireless device has been ordered.

In another illustrative, non-limiting embodiment, a hardware memory device may have program instructions stored thereon that, upon execution by a microcontroller of a peripheral device, cause the peripheral device to: pair with an IHS; and transmit mesh information to the IHS, where the mesh information comprises an identification of another peripheral device.

Pairing with the IHS may include pairing with the IHS after the IHS receives a request from a user, and where the mesh information enables the other peripheral device to be paired with the IHS in the absence of another request from the user. The identification may include at least one of: a BLUETOOTH address, or a name of the other peripheral device. The mesh information may be stored in the hardware memory prior to shipment of the peripheral device to the user.

The program instructions, upon execution, may cause the peripheral device to remove the identification of the other peripheral device from the mesh information in response to an instruction from the IHS, where the instruction is received in response to an indication that the other peripheral device is not being used. Additionally, or alternatively, the program instructions, upon execution, may cause the peripheral device to add an identification of yet another peripheral device to the mesh information in response to an instruction from the IHS, where the instruction is received in response to an indication that the yet another peripheral device has been ordered.

In yet another illustrative, non-limiting embodiment, a method may include ordering a first BLUETOOTH device and a second BLUETOOTH device from an IHS manufacturer, where each BLUETOOTH device is selected from the group consisting of: mouse, keyboard, graphics tablet, image scanner, barcode reader, stylus, camera, webcam, game pad, memory, monitor, projector, printer, microphone, headphones, headset, and loudspeaker; and receiving the first and second BLUETOOTH devices from the manufacturer, where the IHS manufacturer is configured to, prior to shipping the first and second BLUETOOTH devices, write first mesh information to a first hardware memory of the first BLUETOOTH device identifying the second BLUETOOTH device.

The first mesh information may enable the IHS to, in response to pairing the first BLUETOOTH device, automatically pairing the second BLUETOOTH device without asking any user of the IHS. Moreover, the manufacturer may be further configured to, prior to shipping the first and second BLUETOOTH devices, write second mesh information to a second hardware memory of the second BLUETOOTH device identifying the first BLUETOOTH device, and where the second mesh information enables the IHS to, in response to pairing the second BLUETOOTH device, automatically pairing the first BLUETOOTH device without prompting any user of the IHS.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

Embodiments of systems and methods described herein enable group pairing of peripheral devices to one or more Information Handling Systems (IHSs). Examples of peripheral devices include, but are not limited to: mice, keyboards, graphics tablets, image scanners, barcode readers, styluses, cameras, webcams, game pads, memories, monitors, projectors, printers, microphones, headphones, headsets, loudspeakers, etc. In various implementations, a peripheral device may be configured to communicate with an IHS using any suitable wireless protocol, such as BLUETOOTH or the like.

In some cases, to enable group pairing, certain systems and methods may create a pairing mesh at the factory of the all peripheral devices that are shipped together. "Mesh information" is then stored in a hardware memory in each of the peripheral devices prior to being shipped to a customer. When a user of the IHS authorizes or requests the pairing of one of the peripheral devices to the IHS, the mesh information stored in that particular device is transmitted to the IHS and it enables the IHS to automatically pair the other peripheral devices without prompting the user.

A list of peripheral devices connected together in a mesh may be managed via software. If a user wants to use a same set of peripherals with another IHS, the user only needs to pair one of the devices to the other IHS, and all the peripherals in the mesh are automatically paired without prompting the user. Moreover, if the user stops using one of the originally ordered or shipped peripherals and/or if the user adds a new peripheral to the mesh, a remote service may communicate with the IHS to update the mesh information in each of the peripheral devices to remove or add a device to the list.

Figure 1:
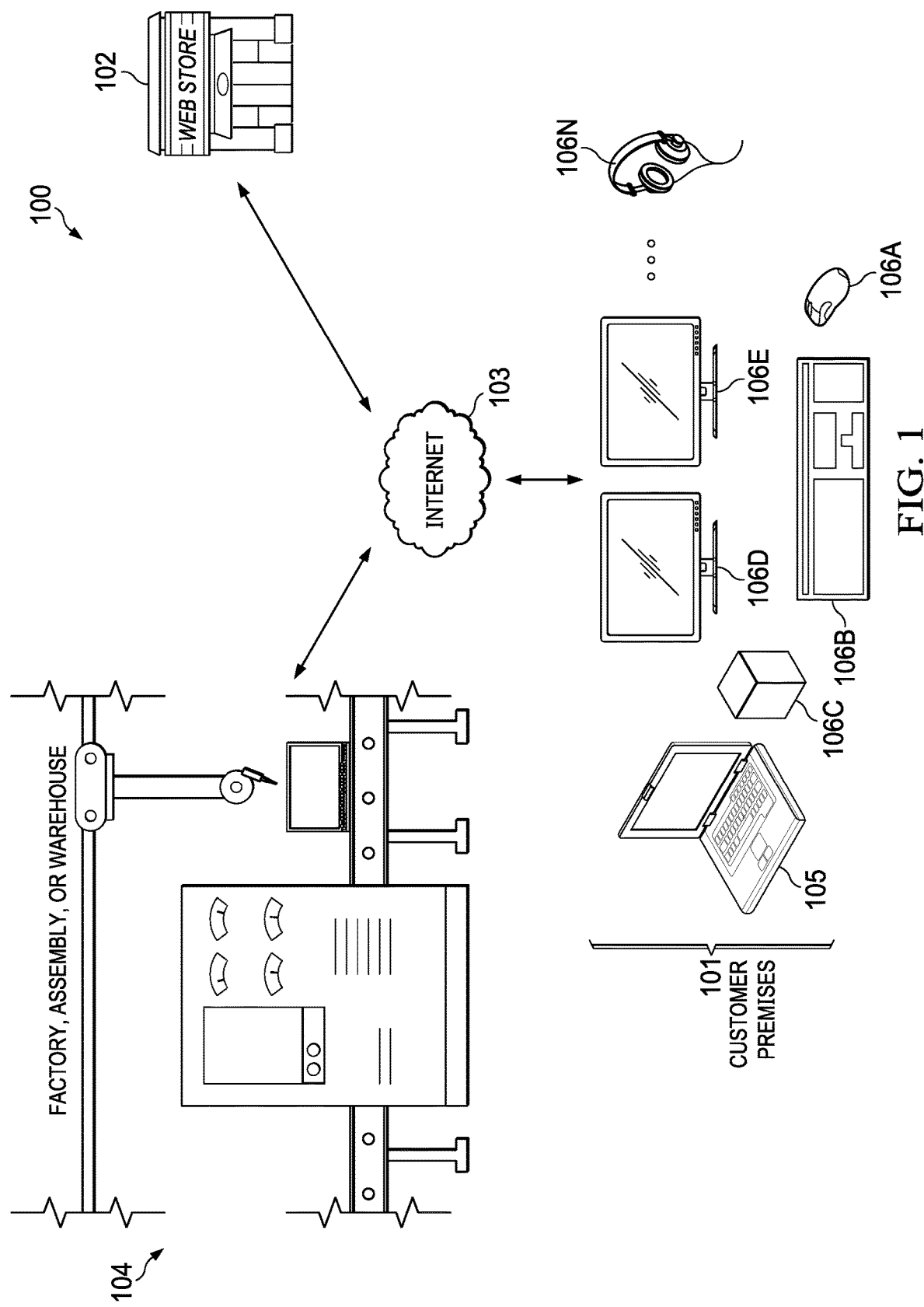
FIG. 1 is a block diagram of an environment where systems and methods for group pairing of peripheral devices may be deployed, according to some embodiments.

FIG. 1 is a block diagram of environment 100 where systems and methods for group pairing of peripheral devices may be deployed. In some embodiments, environment 100 may include the following entities: customer premises 101, retailer or web store 102, and IHS factory, assembly line, or warehouse 104. Each entity may be in communication with one another over a network, such as Internet 103. In other embodiments, however, retailer 102 and IHS factory 104 may be the same entity.

In operation, a user at customer premises 101 may order IHS 105 and peripheral device(s) 106A-N from an IHS manufacturer through retailer or web store 102. Upon receipt of the order, the IHS manufacturer may instruct factory, assembly line, or warehouse 104 to fulfill that order by assembling IHS 105 together with peripheral device(s) 106A-N and then shipping them to the customer. As part of the assembly process, factory, assembly line, or warehouse 104 may configure a pairing mesh of the all peripheral devices 106A-N that are ordered or shipped together.

For example, a technician or automated process may add mesh information to a hardware memory of each of peripheral devices 106A-N. The mesh information may include, for instance, an identification (e.g., an address, a name, etc.) of all peripheral devices in the mesh. Additionally, or alternatively, the mesh information may include an identification of IHS 105 or user (e.g., address, username, etc.). In some cases, prior to or during the automatic pairing of additional peripheral devices 106B-N, IHS 105 may be configured to cross-reference the identities of two or more device in the mesh, including the IHS and/or the user. Moreover, when the user removes a peripheral from the mesh or adds a new peripheral to the mesh, a remote service controlled by the manufacturer may communicate with IHS 105 to update the mesh information in each of the remaining peripheral devices.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources, such as a Central Processing Unit (CPU) or hardware or software control logic, Read-Only Memory (ROM), and/or other types of nonvolatile memory.

Figure 2:
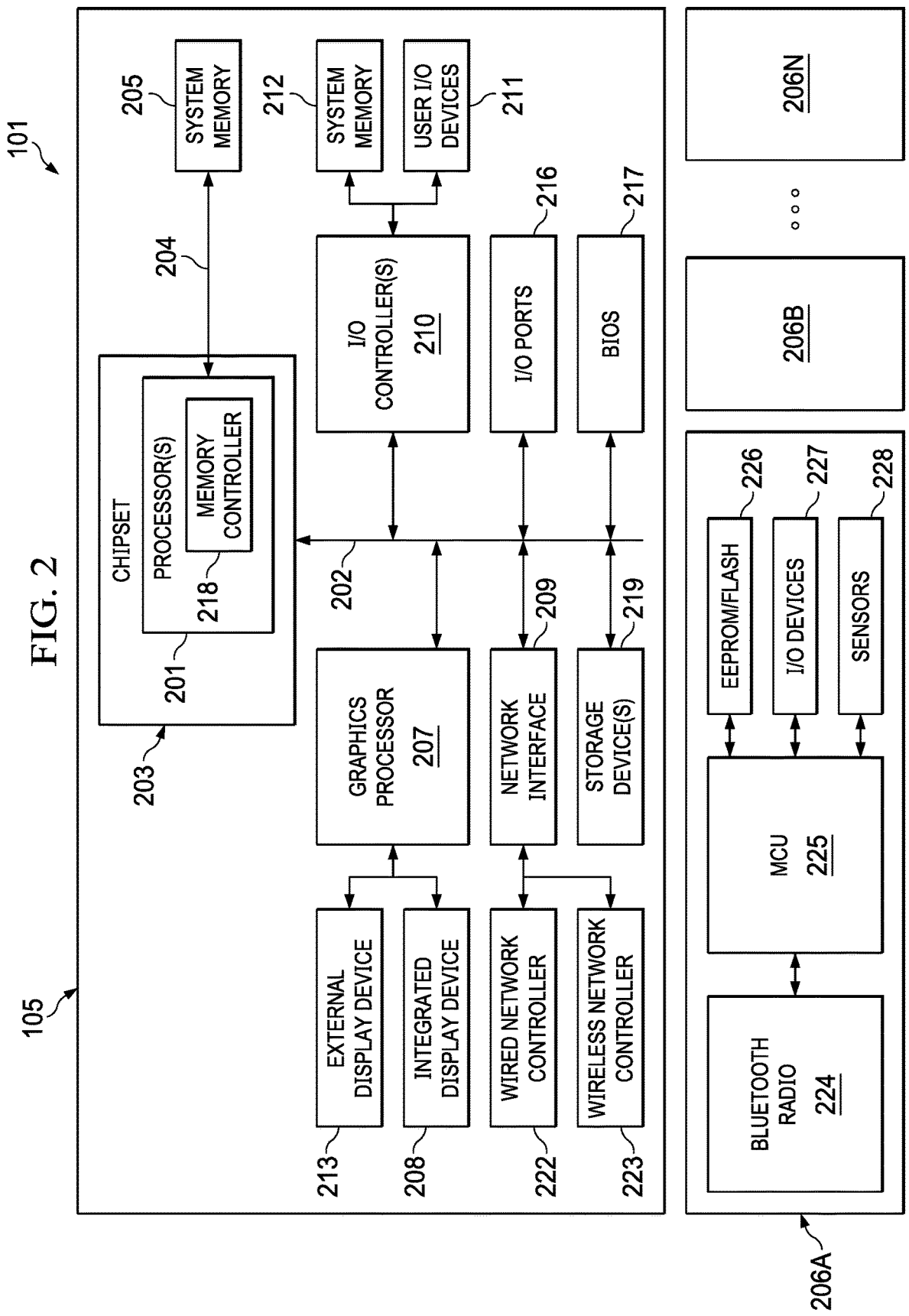
FIG. 2 is a block diagram depicting hardware components of an example Information Handling System (IHS) and peripheral devices configured to perform group pairing, according to some embodiments.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below. FIG. 2 shows an example of an IHS configured to implement the systems and methods described herein according to certain embodiments. It should be appreciated that although certain IHS embodiments described herein may be discussed in the context of a personal computing device, other embodiments may be utilized.

FIG. 2 is a block diagram illustrating certain components of IHS 105 configured to enable group pairing of peripheral devices 106A-N to IHS 105. In various embodiments, another instance of IHS 105 may be used to implement remote services provided by retailer or web store 102, and IHS factory, assembly line, or warehouse 104. While a single IHS 105 is illustrated in FIG. 2, IHS 105 may also be a component of an enterprise system that may include any number of additional IHSs that may also be configured in the same or similar manner to IHS 105.

IHS 105 includes one or more processor(s) 201, such as a Central Processing Unit (CPU), that execute code retrieved from system memory 205. Although IHS 105 is illustrated with single processor 201, other embodiments may include two or more processors, that may each be configured identically, or to provide specialized processing functions. Processor(s) 201 may include any processor(s) capable of executing program instructions, such as an Intel Pentium™ series processor(s) or any general-purpose or embedded processor(s) implementing any of a variety of Instruction Set Architectures (ISAs), such as the x86, POWERPC®, ARM®, SPARC®, or MIPS® ISAs, or any other suitable ISA.

In the embodiment of FIG. 2, processor(s) 201 includes integrated memory controller 218 that may be implemented directly within the circuitry of processor(s) 201, or memory controller 218 may be a separate integrated circuit that is located on the same die as processor(s) 201. Memory controller 218 may be configured to manage the transfer of data to and from the system memory 205 of IHS 105 via high-speed memory interface 204.

System memory 205 coupled to processor(s) 201 provides processor(s) 201 with a high-speed memory that may be used in the execution of computer program instructions by processor(s) 201. Accordingly, system memory 205 may include memory components, such as such as static RAM (SRAM), dynamic RAM (DRAM), NAND Flash memory, suitable for supporting high-speed memory operations by processor(s) 201. In certain embodiments, system memory 205 may combine both persistent, non-volatile memory and volatile memory. In certain embodiments, system memory 205 may include multiple removable memory modules.

IHS 105 utilizes chipset 203 that may include one or more integrated circuits that are connect to processor(s) 201. In the embodiment of FIG. 2, processor 201 is depicted as a component of chipset 203. In other embodiments, all of chipset 203, or portions of chipset 203 may be implemented directly within the integrated circuitry of processor(s) 201. Chipset 203 provides processor(s) 201 with access to a variety of resources accessible via bus 202. In IHS 105, bus 202 is illustrated as a single element. Various embodiments may utilize any number of buses to provide the illustrated pathways served by bus 202.

As illustrated, a variety of resources may be coupled to processor(s) 201 of IHS 105 through chipset 203. For instance, chipset 203 may be coupled to network interface 209 that may support different types of network connectivity. In certain embodiments, IHS 105 may include one or more Network Interface Controllers (NIC), each of which may implement the hardware required for communicating via a specific networking technology, such as BLUETOOTH, Ethernet and mobile cellular networks (e.g., CDMA, TDMA, LTE). As illustrated, network interface 209 may support network connections by wired controller 122 and wireless network controller 223. Each network controller 222, 223 may be coupled via various buses to the chipset 203 of IHS 105 in supporting different types of network connectivity, such as the network connectivity utilized in applications of the operating system of IHS 105.

Chipset 203 may also provide access to one or more display device(s) 208, 213 via graphics processor 207. In certain embodiments, graphics processor 207 may include a video or graphics card or within an embedded controller installed within IHS 105. In certain embodiments, graphics processor 207 may be integrated within processor(s) 201, such as a component of a system-on-chip. Graphics processor 207 may generate display information and provide the generated information to one or more display device(s) 208, 213 coupled to the IHS 105.

The one or more display devices 208, 213 coupled to IHS 105 may utilize LCD, LED, OLED, or other display technologies. Each display device 208, 213 may be capable of receiving touch inputs such as via a touch controller that may be an embedded component of the display device 208, 213 or graphics processor 207, or may be a separate component of IHS 105 accessed via bus 202. As illustrated, IHS 105 may support an integrated display device 208, such as a display integrated into a laptop, tablet, 2-in-1 convertible device, or mobile device. IHS 105 may also support use of one or more external displays 213, such as external monitors that may be coupled to IHS 105 via various types of couplings, including wirelessly.

In certain embodiments, chipset 203 may utilize one or more I/O controllers 210 that may each support hardware components such as user I/O devices 211 and sensors 212. For instance, I/O controller 210 may provide access to one or more user I/O devices 210 such as a keyboard, mouse, touchpad, touchscreen, microphone, speakers, camera and other input and output devices that may be coupled to IHS 105. Each of the supported user I/O devices 211 may interface with the I/O controller 210 through wired or wireless connections.

In certain embodiments, sensors 212 accessed via I/O controllers 210 may provide access to data describing environmental and operating conditions of IHS 105. For instance, sensors 212 may include geo-location sensors capable for providing a geographic location for IHS 105, such as a GPS sensor or other location sensors configured to determine the location of IHS 105 based on triangulation and network information. Various additional sensors, such as optical, infrared and sonar sensors, that may provide support for xR (virtual, augmented, mixed reality) sessions hosted by IHS 105.

Other components of IHS 105 may include one or more I/O ports 216 the support removeable couplings with various types of peripheral external devices. For instance, I/O 216 ports may include USB (Universal Serial Bus) ports, by which a variety of external devices may be coupled to IHS 105. I/O ports 216 may include various types of ports and couplings that support connections with external devices and systems, either through temporary couplings via ports, such as USB ports, accessible to a user via the enclosure of IHS 105, or through more permanent couplings via expansion slots provided via the motherboard or via an expansion card of IHS 105, such as PCIe slots.

Chipset 203 also provides processor(s) 201 with access to one or more storage devices 219. In various embodiments, storage device 219 may be integral to IHS 105, or may be external to IHS 105. In certain embodiments, storage device 219 may be accessed via a storage controller that may be an integrated component of the storage device. Storage device 219 may be implemented using any memory technology allowing IHS 105 to store and retrieve data. For instance, storage device 219 may be a magnetic hard disk storage drive or a solid-state storage drive. In certain embodiments, storage device 219 may be a system of storage devices, such as a cloud drive accessible via network interface 209.

As illustrated, IHS 105 also includes a BIOS (Basic Input/Output System) 217 that may be stored in a non-volatile memory accessible by chipset 203 via bus 202. Upon powering or restarting IHS 105, processor(s) 201 may utilize BIOS 217 instructions to initialize and test hardware components coupled to the IHS 105. BIOS 217 instructions may also load an operating system for use by the IHS 105. BIOS 217 provides an abstraction layer that allows the operating system to interface with the hardware components of IHS 105. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

Still referring to FIG. 2, example components of peripheral device 106A are also depicted. Particularly, device 106A includes microcontroller unit (MCU) 225 coupled to BLUETOOTH radio 224, EEPROM/Flash memory 226, I/O device(s) 227, and/or sensor(s) 228. MCU 225 may be configured to execute program instructions stored in memory 226 to perform one or more operations, typically under control of a user, based upon inputs received from I/O devices (e.g., switches, etc.) and/or sensor(s) 228 (e.g., voltage or current sensors), to enable peripheral device 106A function.

MCU 225 may also implement a BLUETOOTH protocol stack to enable wireless communications with IHS 105 via BLUETOOTH radio 224 (e.g., through IHS 105's wireless network controller 123). In addition, program instructions stored in memory 226 may also configure MCU to execute a device agent that manages a mesh list stored in memory 226; including adding or removing other devices (e.g., 106B-N) to a mesh list, typically in response to commands issued by IHS 105 under instructions received from a remote service (e.g., managed by the IHS manufacturer, factory 104, or retailer 102).

Figure 3:
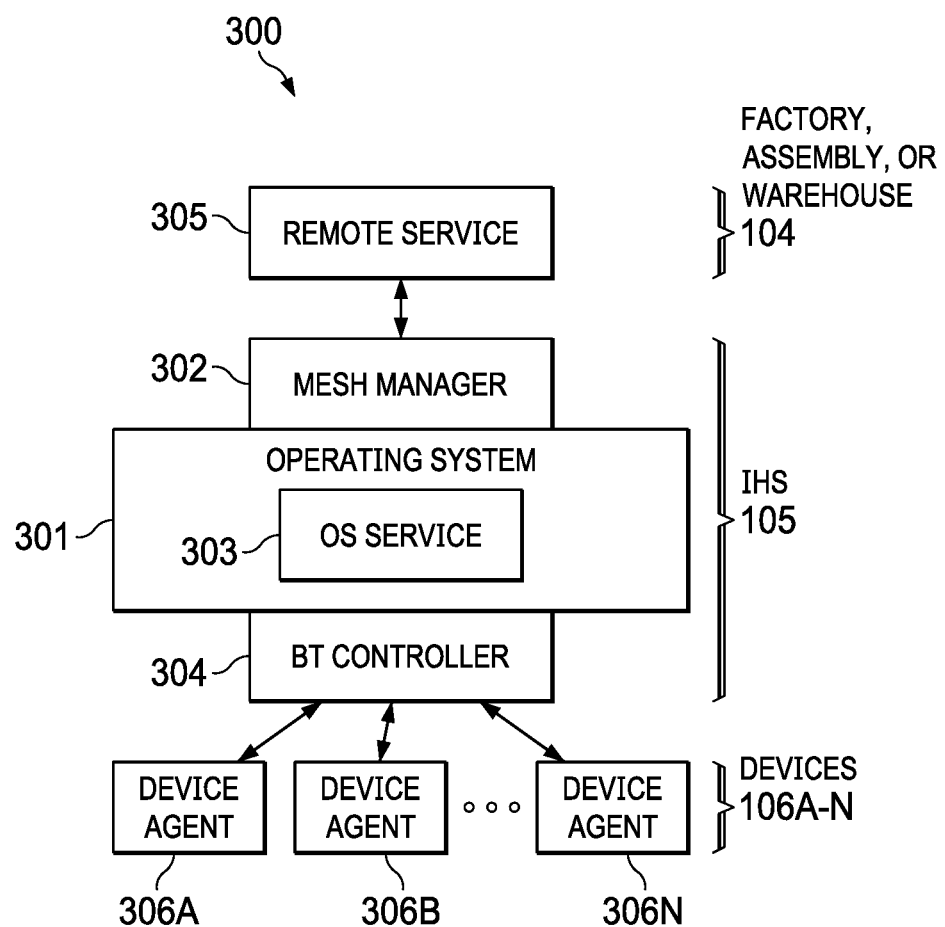
FIG. 3 is a block diagram depicting software components configured to perform group pairing, according to some embodiments.

FIG. 3 is a block diagram depicting software components 300 configured to perform group pairing. Specifically, remote service 305 may be hosted by one or more IHSs (e.g., similar to IHS 105 of FIG. 2) under control of IHS manufacturer, factory 104, and/or retailer 102. Remote service 305 is in communication with mesh manager application 302 executed by IHS 105 on top of OS 301 layer. Mesh manager 302 may also include an Application Programming Interface (API) to enable other applications executed by OS 301 to retrieve, store, and/or modify a mesh list stored in a peripheral device 106A-N.

OS layer 301 includes OS service 303, which interfaces mesh manager 302 with BT controller 304. In some cases, BT controller 304 may implement at least a portion of a BLUETOOTH protocol stack for enabling OS service 303 to access a BLUETOOTH radio or the like. Meanwhile, each of peripheral devices 106A-N implements a corresponding device agent 306A-N configured to store and maintain a mesh list with the identities of other respective peripheral devices in the mesh. In operation, one or more of software components 300 may perform methods 400-600 described in more detail below.

Figure 4:
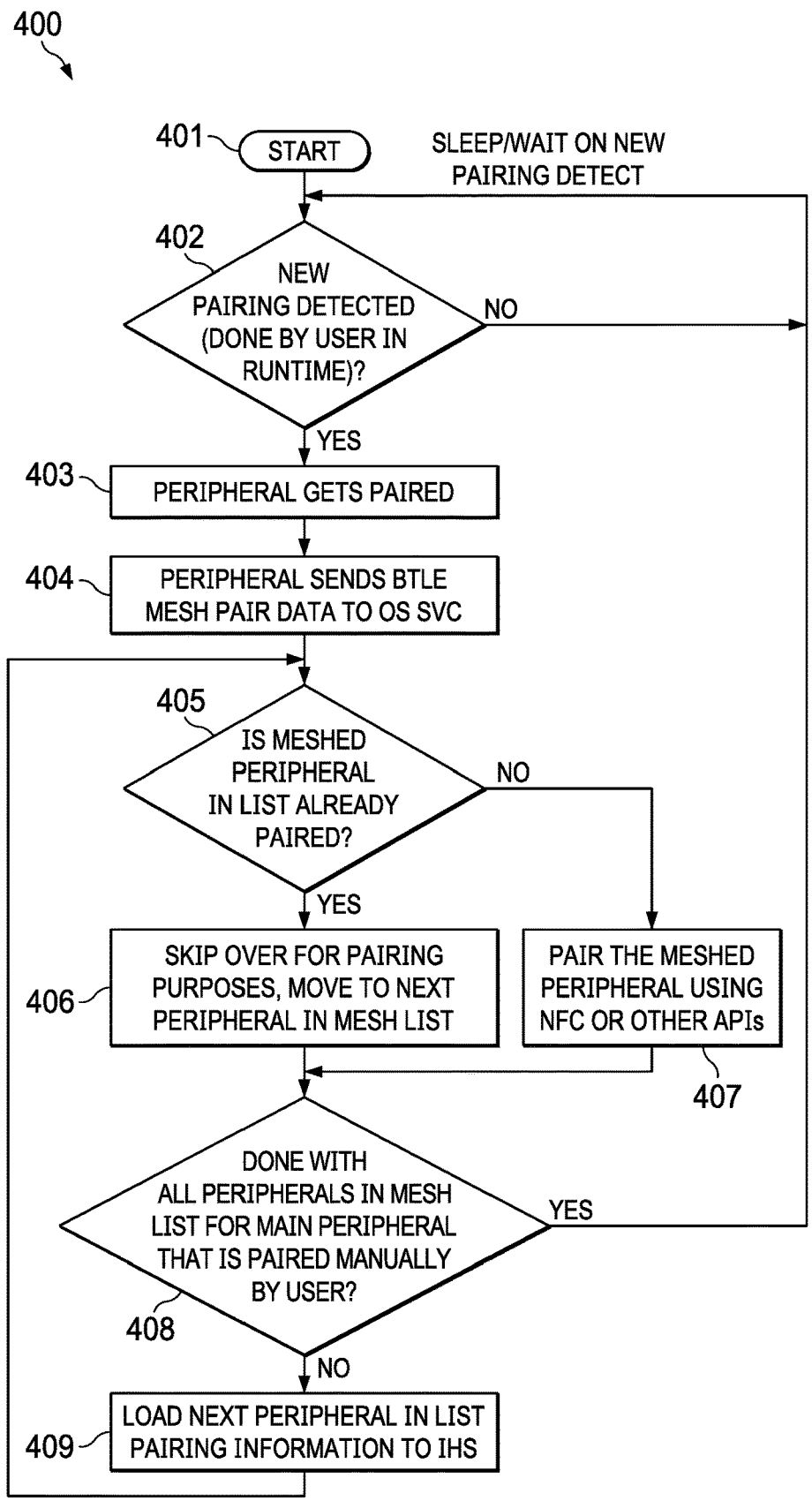
FIG. 4 is a flowchart of a method for group pairing of peripheral devices, according to some embodiments.

FIG. 4 is a flowchart of method 400 for group pairing of peripheral devices. In some embodiments, method 400 may be performed by mesh manager 302 in cooperation with OS service 303 and in communication with device agent 306A. Particularly, method 400 starts at 401 during runtime. At 402, method 400 detects a new peripheral device—e.g., device 106A—to be paired (e.g., following the BLUETOOTH protocol) and asks a user whether or not pair the device. For example, IHS 105 may display a message or prompt to the user via a Graphical User Interface (GUI). In response to an affirmative answer (e.g., received via a keyboard, mouse, trackpad, etc.) from the user, block 403 may pair device 106A to IHS 105.

Pairing mechanisms that may be implemented at block 403 include, but are not limited to: legacy pairing, limited input devices, numeric input devices, alpha-numeric input devices, and Secure Simple Pairing (SSP). Particularly, legacy pairing is available in BLUETOOTH v2.0 and earlier version. When legacy pairing, each device enters a PIN code and pairing is only successful if both devices enter the same PIN code (generally, any 16-byte UTF-8 string may be used as a PIN code). With limited input device pairing, the peripheral device may have a fixed PIN, for example "0000" or "1234," that is hardcoded into the device. In contrast, numeric input devices allow a user to enter a numeric value up to 16 digits in length, and alpha-numeric input devices allow a user to enter full UTF-8 text as a PIN code.

SSP is required by BLUETOOTH v2.1 and it uses a form of public key cryptography with an authentication mechanism including, but not limited to: (i) "just works:" may require no user interaction and/or it may prompt the user to confirm the pairing process, which is used by devices with very limited I/O capabilities; (ii) numeric comparison: when both devices have a display, and at least one can accept a yes/no user input, such that the method displays a 6-digit numeric code on each device and the user compares the numbers to ensure they are identical before confirming pairing on the device(s) that can accept an input; (iii) passkey entry: used between a device with a display and a device with numeric keypad entry (such as a keyboard), or two devices with numeric keypad entry, such that the display presents a 6-digit numeric code to the user, who then enters the code on the keypad; or (iv) Out of band (OOB): uses an external communication channel, such as near-field communication (NFC), to exchange some information used in the pairing process.

At block 404, device agent 306A (e.g., of peripheral device 106A) sends mesh information to OS service 303 of IHS 105. For instance, the mesh information may include an identification of other peripheral device(s) (e.g., 106B-N). Examples of device identification include, but are not limited to: BLUETOOTH address, device name, etc. Then, at block 405, mesh manager 302 determines whether a meshed peripheral device identified in the mesh list (e.g., 106B) is already paired with IHS 105. If so, block 406 skips over that device for pairing purposes, and moves on the next peripheral on the mesh list. Otherwise, at block 407, mesh manager 302 pairs the identified peripheral device (e.g., using NFC or other APIs) without prompting any user of IHS 105.

At block 408, mesh manager 302 determines whether all peripherals in the mesh list for the main peripheral device—that is, device 106A—have already been paired. If so, control returns to block 402. Otherwise, at block 409, mesh manager 302 loads the next peripheral in the mesh list for pairing with IHS 105, and control returns to block 405.

In some cases, after pairing a second peripheral device—e.g., device 106B—at block 407, mesh manager 302 may retrieve a second mesh list associated with that second device from its respective internal memory. Mesh manager 302 may then cross-reference the second mesh list to ensure that the first device is part of that list. Additionally, or alternatively, each mesh list may identify IHS 105 (e.g., MAC address, serial number, etc.) and/or the user (e.g., username, etc.) to further ensure that the mesh is paired as intended. If the user later decides to use peripheral device 106A with another IHS, all other peripheral in the mesh list may be automatically paired to the other IHS upon successfully pairing of the first device, following method 400.

Figure 5:
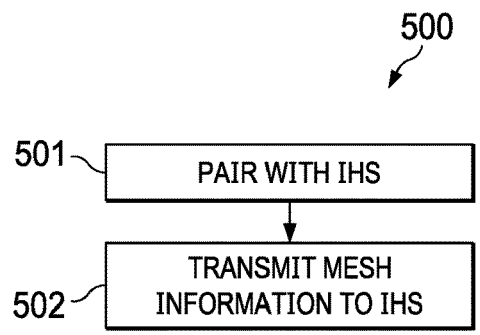
FIG. 5 is a flowchart of a method for transmitting mesh information to an IHS by a peripheral device, according to some embodiments.

FIG. 5 is a flowchart of method 500 for transmitting mesh information to IHS 105. In some embodiments, method 500 may be performed by any of peripheral devices 106A-N. Particularly, at block 501, peripheral device 106A pairs with IHS 105 (e.g., as in block 403 of method 400). Then, at block 502, peripheral device 106A sends its mesh list, stored in its internal memory, to IHS 105 (e.g., as in block 404 of method 400).

Figure 6:
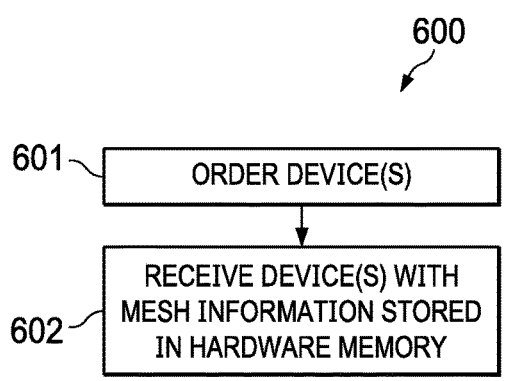
FIG. 6 is a flowchart of a method for ordering and receiving a pre-paired group of peripheral devices, according to some embodiments.

FIG. 6 is a flowchart of method 600 for ordering and receiving a pre-paired group of peripheral devices 106A-N. In some embodiments, method 600 may be performed by a user operating IHS 105 (or any other IHS). At block 601, the user orders one or more peripheral device(s) 106A-N from retailer or web store 102, and IHS factory, assembly line, or warehouse 104 builds out a mesh prior to shipping the devices to the user. At block 602, the user receives the ordered devices with mesh information stored in their internal memories.

The assembly process performed by factory 104 place at some time between blocks 601 and 602 may include storing mesh information in each of the devices that are expected to participate in a mesh once deployed at customer's premises 101. For instance, in the case of a mouse and a keyboard, factory 104 may include write an identification of the keyboard to a mesh list stored in the mouse's internal memory such that, once the mouse is manually paired by the user, the keyboard is also paired automatically without prompting the user.

In some situations, the customer may make changes to the mesh after the ordering or shipment of the original devices. In that case, upon receiving an instruction from remote service 105, mesh manager 302 may transmit a command to each peripheral device to update its respective mesh information.

Figure 7:
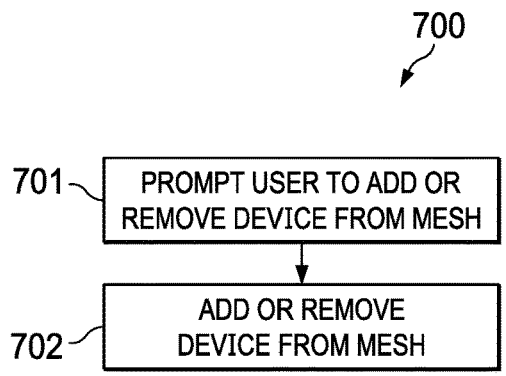
FIG. 7 is a flowchart of a method for adding and/or removing devices to/from a group of peripheral devices, according to some embodiments.

FIG. 7 is a flowchart of method 700 for adding and/or removing devices to/from a group of peripheral devices. In some embodiments, method 700 may be performed by any of peripheral devices 106A-N and/or by IHS 105. In this example, at block 701, method 700 may optionally prompt a user to add or remove a device from a mesh. For example, a command from mesh manager 302 to peripheral devices 106A-N may be configured to remove the identification of a given device from all other devices' mesh information in response to remote service 305 and/or mesh manager 302 receiving an indication that the given device is not being used (e.g., defective, under repair, or disposed of). Additionally, or alternatively, the command may be configured to add an identification of a given device to the mesh information of all other devices in a same mesh in response to remote service 105 and/or mesh manager 302 receiving an indication that the given device has been ordered via retailer or web store 102, or otherwise acquired by the user. Then, at block 702, method 700 may execute the command—that is, add and/or remove an identification of any given device to the mesh information of all other peripheral devices in the same mesh.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
a processor; and
a memory coupled to the processor, the memory having program instructions stored thereon that, upon execution, cause the IHS to:
ask a user whether to pair a first wireless device to the IHS;
in response to an affirmative answer, pair the first wireless device to the IHS;
retrieve mesh information from the first wireless device, wherein the mesh information comprises an identification of a second wireless device;
automatically pair the second wireless device to the IHS using the mesh information without prompting the user;
receive an instruction from a remote service; and
in response to the instruction, transmit a command to the first wireless device to update the mesh information, wherein the command is configured to remove the identification of the second wireless device from the mesh information in response to the remote service receiving an indication that the second wireless device is not being used.

2. The IHS of claim 1, wherein to ask the user whether to pair the first wireless device, the program instructions, upon execution, further cause the IHS to display a message via a Graphical User Interface (GUI), and wherein the affirmative answer is received via a keyboard, mouse, or trackpad coupled to the IHS.

3. The IHS of claim 1, wherein the first wireless device and the second wireless device comprise BLUETOOTH-enabled devices, and wherein each device is selected from the group consisting of: mouse, keyboard, graphics tablet, image scanner, barcode reader, stylus, camera, webcam, game pad, memory, monitor, projector, printer, microphone, headphones, headset, and loudspeaker.

4. The IHS of claim 1, wherein the identification comprises at least one of an address or a name of the second wireless device.

5. The IHS of claim 1, wherein the mesh information is stored in an internal memory of the first wireless device.

6. The IHS of claim 5, wherein the mesh information is stored in the internal memory during prior to shipment of the first wireless device to the user.

7. The IHS of claim 1, wherein the program instructions, upon execution, further cause the IHS to, prior to the automatic pairing of the second wireless device to the IHS, retrieve other mesh information from the second wireless device identifying the first wireless device.

8. The IHS of claim 1, wherein the program instructions, upon execution, further cause the IHS to, prior to the automatic pairing of the second wireless device to the IHS, retrieve other mesh information from the second wireless device identifying the IHS.

9. The IHS of claim 1, wherein the command is configured to add an identification of a third wireless device to the mesh information in response to the remote service receiving an indication that the third wireless device has been ordered.

10. A hardware memory device having program instructions stored thereon that, upon execution by a processor of an Information Handling System (IHS), cause the IHS to:
ask a user whether to pair a first wireless device to the IHS;
in response to an affirmative answer, pair the first wireless device to the IHS;
retrieve mesh information from the first wireless device, wherein the mesh information comprises an identification of a second wireless device;
automatically pair the second wireless device to the IHS using the mesh information without prompting the user;
receive an instruction from a remote service; and
in response to the instruction, transmit a command to the first wireless device to update the mesh information, wherein the command is configured to remove the identification of the second wireless device from the mesh information in response to the remote service receiving an indication that the second wireless device is not being used.

11. The hardware memory device of claim 10, wherein to ask the user whether to pair the first wireless device, the program instructions, upon execution, further cause the IHS to display a message via a Graphical User Interface (GUI), and wherein the affirmative answer is received via a keyboard, mouse, or trackpad coupled to the IHS.

12. The hardware memory device of claim 10, wherein the first wireless device and the second wireless device comprise BLUETOOTH-enabled devices, and wherein each device is selected from the group consisting of: mouse, keyboard, graphics tablet, image scanner, barcode reader, stylus, camera, webcam, game pad, memory, monitor, projector, printer, microphone, headphones, headset, and loudspeaker.

13. The hardware memory device of claim 10, wherein the identification comprises at least one of an address or a name of the second wireless device.

14. The hardware memory device of claim 10, wherein the mesh information is stored in an internal memory of the first wireless device.

15. The hardware memory device of claim 14, wherein the mesh information is stored in the internal memory during prior to shipment of the first wireless device to the user.

16. The hardware memory device of claim 10, wherein the program instructions, upon execution, further cause the IHS to, prior to the automatic pairing of the second wireless device to the IHS, retrieve other mesh information from the second wireless device identifying the first wireless device.

17. The hardware memory device of claim 10, wherein the program instructions, upon execution, further cause the IHS to, prior to the automatic pairing of the second wireless device to the IHS, retrieve other mesh information from the second wireless device identifying the IHS.

18. The hardware memory device of claim 10, wherein the command is configured to add an identification of a third wireless device to the mesh information in response to the remote service receiving an indication that the third wireless device has been ordered.

19. A method, comprising:

asking a user whether to pair a first wireless device to an Information Handling System (IHS);

in response to an affirmative answer, pairing the first wireless device to the IHS;

retrieving mesh information from the first wireless device, wherein the mesh information comprises an identification of a second wireless device;

automatically pairing the second wireless device to the IHS using the mesh information without prompting the user;

receiving an instruction from a remote service; and in response to the instruction, transmitting a command to the first wireless device to update the mesh information, wherein the command is configured to remove the identification of the second wireless device from the mesh information in response to the remote service receiving an indication that the second wireless device is not being used.

20. The method of claim 19, wherein the first wireless device and the second wireless device comprise BLUETOOTH-enabled devices, and wherein each device is selected from the group consisting of: mouse, keyboard, graphics tablet, image scanner, barcode reader, stylus, camera, webcam, game pad, memory, monitor, projector, printer, microphone, headphones, headset, and loudspeaker.

* * * * *